(12) United States Patent
Alewine et al.

(10) Patent No.: US 7,472,061 B1
(45) Date of Patent: Dec. 30, 2008

(54) SYSTEMS AND METHODS FOR BUILDING A NATIVE LANGUAGE PHONEME LEXICON HAVING NATIVE PRONUNCIATIONS OF NON-NATIVE WORDS DERIVED FROM NON-NATIVE PRONUNCIATIONS

(75) Inventors: Neal Alewine, Lake Worth, FL (US); Eric Janke, Winchester (GB); Paul Sharp, Workingham Bershire (GB); Roberto Sicconi, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,713

(22) Filed: Mar. 31, 2008

(51) Int. Cl.
*G10L 15/06* (2006.01)
*G10L 15/28* (2006.01)
*G10L 13/06* (2006.01)

(52) U.S. Cl. .................. 704/243; 704/254; 704/255; 704/266

(58) Field of Classification Search .................. None
See application file for complete search history.

(56) References Cited

U.S. PATENT DOCUMENTS

| | | | |
|---|---|---|---|
| 6,078,885 A | 6/2000 | Beutnagel | |
| 6,085,160 A * | 7/2000 | D'hoore et al. | 704/256.2 |
| 6,243,680 B1 | 6/2001 | Gupta et al. | |
| 6,363,342 B2 | 3/2002 | Shaw et al. | |
| 6,738,738 B2 | 5/2004 | Henton | |
| 6,738,745 B1 | 5/2004 | Navratil et al. | |
| 7,139,708 B1 | 11/2006 | Olorenshaw et al. | |
| 7,181,395 B1 | 2/2007 | Deligne et al. | |
| 7,277,851 B1 | 10/2007 | Henton | |
| 7,315,811 B2 | 1/2008 | Cote et al. | |
| 2002/0095282 A1 | 7/2002 | Goronzy et al. | |
| 2002/0111805 A1 | 8/2002 | Goronzy et al. | |
| 2003/0050779 A1 * | 3/2003 | Riis et al. | 704/236 |
| 2004/0153306 A1 * | 8/2004 | Tanner et al. | 704/4 |
| 2005/0033575 A1 * | 2/2005 | Schneider | 704/254 |
| 2005/0187758 A1 | 8/2005 | Khasin | |
| 2005/0197835 A1 * | 9/2005 | Reinhard et al. | 704/249 |
| 2005/0197837 A1 * | 9/2005 | Suontausta et al. | 704/260 |
| 2007/0255567 A1 | 11/2007 | Bangalore et al. | |
| 2007/0294082 A1 | 12/2007 | Jouvet et al. | |
| 2008/0052077 A1 | 2/2008 | Bennett et al. | |

OTHER PUBLICATIONS

Katarina Bartkova, Denis Jouvet. Automatic Detection of Foreign Accent for Automatic Speech Recognition. ICPhS XVI. ID1126. Saarbrucken, Aug. 6-10, 2007, pp. 2185-2188 www.icphs2007.de.
Judith Kessens. Non-Native Pronunciation Modeling in a Command & Control Recognition Task: A Comparison between Acoustic and Lexical Modeling. TNO Human Factors, Soesterberg, The Netherlands.
Ambra Neri, Catia Cucchiarini, Wilhelmus Strik. Automatic Speech Recognition for Second Language Learning: How and Why it Actually Works. 15th ICPhS Barcelona. A2RT, Department of Language and Speech, University of Nijmegen, The Netherlands.

(Continued)

*Primary Examiner*—David R Hudspeth
*Assistant Examiner*—Matthew J Sked
(74) *Attorney, Agent, or Firm*—Keusey, Tutunjian & Bitetto, P.C.

(57) ABSTRACT

Systems and methods are provided for automatically building a native phonetic lexicon for a speech-based application trained to process a native (base) language, wherein the native phonetic lexicon includes native phonetic transcriptions (base forms) for non-native (foreign) words which are automatically derived from non-native phonetic transcriptions of the non-native words.

1 Claim, 3 Drawing Sheets

OTHER PUBLICATIONS

Silke Goronzy, Kathrin Eisele. Automatic Pronunciation Modelling for Multiple Non-Native Accents. proc. of ASRU '03, pp. 123-128, 2003.

M. Kumar, N. Rajput, A. Verma. A Large-Vocabulary Continuous Speech Recognition System for Hindi. IBM J. Res. & Dev. vol. 48 No. 5/6 Sep./Nov. 2004. pp. 703-715.

* cited by examiner

SYSTEMS AND METHODS FOR BUILDING A NATIVE LANGUAGE PHONEME LEXICON HAVING NATIVE PRONUNCIATIONS OF NON-NATIVE WORDS DERIVED FROM NON-NATIVE PRONUNCIATIONS

TECHNICAL FIELD

Embodiments of the invention relate to the field of multi-language speech processing systems and, in particular, systems and methods for automatically building a native phonetic lexicon for a speech-based application trained to process a native (base) language, wherein the native phonetic lexicon includes native phonetic transcriptions (base forms) for non-native (foreign) words which are automatically derived from non-native phonetic transcriptions of the non-native words.

BACKGROUND

In general, various types of speech applications can be implemented using ASR (automatic speech recognition) systems and TTS (text-to-speech) synthesis systems. As is known in the art, ASR systems are typically implemented in speech-based systems to enable machine recognition of speech input by a user and thereby enable user command and control and conversational interaction with the system. Moreover, TTS systems operate by converting textual data (e.g., a sequence of one or more words) into an acoustic waveform which can be output as a spoken utterance. TTS systems can be used in interactive voice response (IVR) systems, for example, to provide spoken output to a user.

In general, ASR systems are implemented using an acoustic vocabulary and a language vocabulary. In a language vocabulary (or word vocabulary), words are represented with an ordinary textual alphabet. In an acoustic vocabulary, the spoken sounds of words are represented by an alphabet consisting of a set of phonemes. The words that comprise the acoustic vocabulary are referred to as base forms. These base forms can be generated either manually or automatically by utilizing spelling-to-sound mapping techniques. For a given language, there can be several base forms for one word. By way of example, in the English language, the word "A" can have two different pronunciations and, therefore, two different base forms. A phonetic lexicon includes a word—base form mapping table that stores the list of vocabulary words for a given language together with their corresponding base forms.

In real-world applications, there are instances in which speech applications that are trained for processing a native language are faced with the task of processing non-native speech or textual data (foreign words). In an ASR system trained on a native language, decoding accuracy can be significantly degraded when native speakers utter foreign words or non-native pronunciations. For example, in a speech-based navigation application having a front-end ASR system trained on native English language, a user may utter a spoken query such as "What is the quickest route to the Champs Elysees", where "Champs Elysees" are foreign (non-native) words relative to English. Similarly, TTS spoken output from the navigation system may need to recognize that "Champs Elysees" represent foreign words relative to the English TTS system when producing a synthesized speech output such as "Turn Right onto the Champs Elysees".

A conventional method for generating pronunciations for non-native words is to use a phonetiser adapted for the base native language. In general, a phonetiser system operates to convert text to a corresponding phonetic representation of such text (phonetic spellings). However, when directly converting non-native text to phonetic representations in a native language, non-native pronunciations may not be adequately captured, thereby resulting in degraded system performance. While this approach may be sufficient for a speaker with no knowledge of the foreign language, such approach will certainly be sub-optimal if the speaker has any knowledge of the foreign language, or even just knows how to pronounce the foreign words. For example, in the example navigation phrase above, the English spelling-to-phoneme system may produce the following for "Champs Elysees":

champs-eh-lie-zeez~CH AE M P S EH L AY Z IY Z

On the other hand, a person with some knowledge of French, or the proper French pronunciation of the place name, would utter, for example:

shanz-eh-lee-zay~SH OH NG Z AX L IY Z EY

In view of the disparity in the above phoneme strings, it is unlikely that the latter utterance would be matched to the phoneme string: CH AE M P S EH L AY Z IY Z Similarly, numbers are pronounced quite differently in different languages. For example, the number 69 would pronounce differently for the following languages:

English—"sixty-nine"

French—"soixant-neuf"

German—"neun-und-sechzig"

The above examples illustrate that there can be a significant amounts of mismatch if the wrong pronunciation is modeled. Conventional solutions to address this problem are not desirable. For instance, running parallel speech recognizers, each capable of performing the ASR task for a particular language, has been suggested, but this approach has a significant CPU and memory resource overhead, and is less capable of handling the mixed-language utterances shown above.

SUMMARY OF THE INVENTION

Exemplary embodiments of the invention generally include systems and methods for automatically building a native phonetic lexicon for a speech-based application trained to process a native (base) language, wherein the native phonetic lexicon includes native phonetic transcriptions (base forms) for non-native (foreign) words which are automatically derived from non-native phonetic transcriptions of the non-native words.

In one exemplary embodiment of the invention, a method for generating base forms for non-native language in a speech-based system trained for processing of a native language is provided, wherein the method includes receiving textual data comprising a native language word and a non-native language word, generating a native phonetic transcription of the native language word using phonetic units of the native language, generating a non-native phonetic transcription of the non-native language word using phonetic units of the non-native language, generating a native pronunciation of the non-native language word using phonetic units of the native language by mapping the phonetic units of the non-native phonetic transcription to acoustically similar phonetic units of the native language, and storing the non-native language word in association with its native pronunciation in a native phonetic lexicon.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary systems and methods for automatically building native phonetic lexicons for speech-based applications trained to process a native (base) language will now be discussed with referent to the exemplary illustrations of FIGS. 1, 2 and 3, for example, wherein native phonetic lexicons are built having native phonetic transcriptions (base forms) for non-native (foreign) words that are automatically derived from non-native phonetic transcriptions of the non-native words. It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., hard disk, magnetic floppy disk, RAM, CD ROM, DVD, ROM and flash memory), and executable by any device or machine comprising suitable architecture. It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
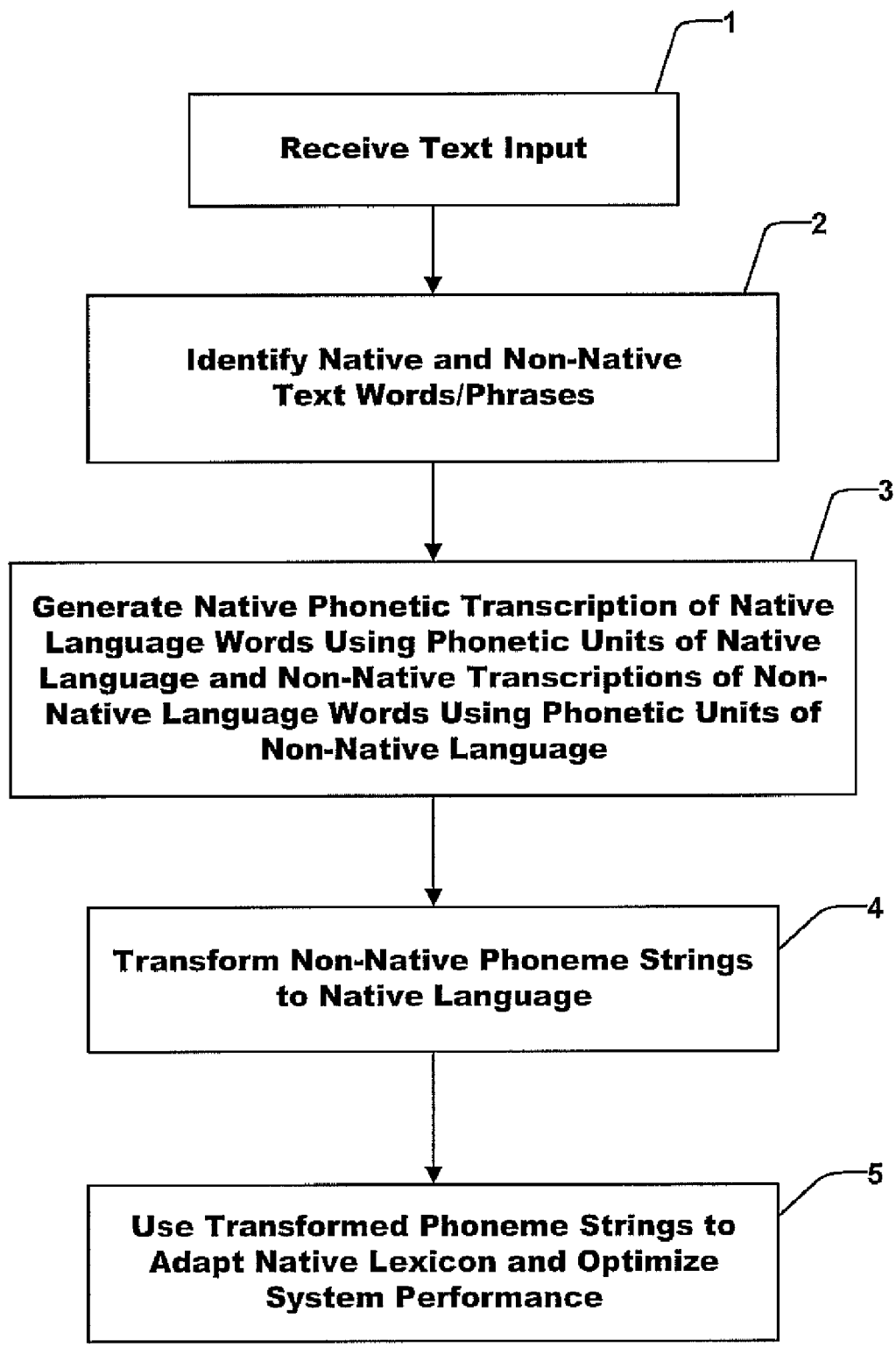
FIG. 1 is a high-level flow diagram of a method for automatically building a native phonetic lexicon having native phonetic transcriptions (base forms) for non-native (foreign) words that are automatically derived from non-native phonetic transcriptions of the non-native words, according to an exemplary embodiment of the invention.

Referring now to FIG. 1, a high-level flow diagram is shown of a method for automatically building a native phonetic lexicon having native phonetic transcriptions (base forms) for non-native (foreign) words that are automatically derived from non-native phonetic transcriptions of the non-native words, according to an exemplary embodiment of the invention. Initially, textual data is input to a text processing system which is part of a speech-based application trained for a native language (step 1). The textual data may comprise native language words as well as non-native language words. The textual data is then processed to identify the native and non-native language words/phrases in the input text data (step 2). Thereafter, a native phonetic transcription is automatically generated for the native language words using phonetic units of the native language, and a non-native phonetic transcription is automatically generated for the non-native language words using phonetic units of the non-native language (step 3). The phonetic transcriptions for each identified word may be generated by applying a corresponding language-specific phonetiser application (i.e., spelling to phoneme system) to the words/phrases to generate a phonetic transcription by segmenting the textual data into a sequence of phonetic units. The textual data may be segmented into phonetic units such as phonemes, sub-phoneme units, etc.

Next, the pronunciations for the non-native phoneme strings are transformed to the base (native) language (step 4) (i.e., the pronunciations are transformed to the corresponding phonetic alphabet of the base language). For instance, native pronunciations of the non-native language words may be generated using phonetic units of the native language by mapping the phonetic units of the non-native phonetic transcription to acoustically similar phonetic units of the native language. Finally, the non-native language words can be stored in association with their corresponding native pronunciations in a native phonetic lexicon, where the transformed pronunciations can be used to optimize system performance (step 5).

It is to be understood that FIG. 1 illustrates a general, high-level process flow where each process step can be implemented using various techniques, according to exemplary embodiments of the invention. For instance, the language identification process (step 2), although optional, is a preferred part of the process flow in exemplary embodiments in which phonetic transcription of the words in the appropriate language is facilitated by each word having a language identifier. In general, the process of language identification is not trivial, but there are a number of procedures which could be adopted, depending on the circumstances and the footprint required.

By way of example, in one exemplary embodiment of the invention the language identification process (step 2) can be implemented using an automated method for tagging words at the point of grammar creation. For instance, the following example shows the results of tagging words of an input text string in English (native) and French (non-native):

"Quickest_EN route_EN to_EN Champs_FR Elysees_FR".

This tagging process requires an extra level of information from the application designer, but such information is often available (e.g., song titles or navigation systems for particular country).

In another exemplary embodiment, language identification process can be implemented using language-specific phonetic spelling dictionaries. With this exemplary embodiment, each word in the text input sequence could be compared with words in different dictionaries of a multilingual phonetic spelling dictionary. For instance, the multilingual phonetic spelling dictionary may comprise a phonetic spelling dictionary for two or more languages. Each phonetic spelling dictionary comprise a spelling-to-sound mapper module that maps the language vocabulary into an acoustic vocabulary consisting of base forms. If a word is present in one of the phonetic spelling dictionaries, then the word is processed against the corresponding phone-mapper to generate a representative phoneme string in the target (non-native) language. On the other hand, if a given word is not present in any of the phonetic spelling dictionaries, the language identification process can be skipped and the word just passed to the native (base) language phonetiser or passed through a supplementary language-identifier.

In another exemplary embodiment of the invention, a rules based approach may be implemented whereby a set of predefined rules that are based on letter-sequences and accented characters, as used as a guide to identify the particular language associated with a word. For example, a word containing an accented character, e.g., "ü" would be indicative of the German language. In yet another exemplary embodiment language identification can be implemented using known methods that employ a statistical model approach to identify letter sequences indicative of a particular language.

There are number of methods that may be implemented for generating phonetic transcriptions of native and non-native language words in step 3, FIG. 1 to produce phoneme strings from input text. For instance, a phonetic transcriptions for each identified word may be generated by applying a corresponding language-specific phonetiser application (i.e., spelling to phoneme system) to the words/phrases to generate a phonetic transcription by segmenting the textual data into a sequence of phonetic units. Moreover, as noted above, phonetic dictionaries to covert text strings to corresponding phoneme strings. A phonetic dictionary for a given language provides a mapping of words to their phonemes for the given language. A phonetic dictionary can be, for instance, a text file containing words, phonemes and any other relevant referencing information, such as the number of different types of speech (e.g., noun or verb) and the number of phonetic spellings. When given a text word, a phonetic converter returns the corresponding phoneme by accessing the phonetic dictionary.

In another exemplary embodiment of the invention, a TTS (Text-to-Speech) front-end system can be implemented as an initial step in converting text to speech (audio), text is first converted into the correct phoneme string, based on the pronunciation rules of the given language In other exemplary embodiments of the invention, a statistical model may be used to determine a best phoneme sequence from input text, for a given language. A statistical base form service, such as the eVV EBG technology, can be used for this purpose.

Various methods may be employed to implement the transformation process of step 4, FIG. 1. In one exemplary embodiment, the transformation algorithm could be a phone mapping, however more sophisticated, context-dependent transformations could also be applied. Various methods known in the art for producing language-language phone maps may be implemented for transforming non-native phoneme strings to native phoneme strings, which are is relatively straightforward, and perfection would not be required as this is already an approximation. It is to be noted the phone mapping is not necessarily reversible, so separate maps would be used for each "foreign-base" language pair. This phone mapping process could be facilitated by the adoption of a "Common Phonology", such as one derived from defined phone sets for labeling speech databases for sound of large numbers of languages as provided by the IPA (the International Phonetic Association) or the Speech Assessment Methods Phonetic Alphabet (SAMPA). SAMPA is a computer-readable phonetic script, based on IPA, though the invention does not depend on this.

In other exemplary embodiments of the invention, the process flow of FIG. 1 can be refined to meet different requirements. For instance, in addition to producing a pronunciation in the non-native language, an alternative pronunciation in the base-language can also be produced as an alternative to provide pronunciations that reflect actual pronunciations that would be spoken/understood by those speakers having no knowledge of the foreign language. There are a number of refinements to this concept aimed at reducing confusion (and footprint) caused by having too many alternatives. For instance, if a language identifier tags a given word as being part of a base language, the process may be configured to not produce an alternative pronunciation in this circumstance. The level of confidence required here would be tunable and application-specific. In another embodiment, using a phone-similarity measure such as the Phone Confusability Matrix in the IBM eVV system, if the alternative pronunciation is measured to be very similar to that in base language, the alternative could be discarded.

In yet another embodiment, resulting pronunciations could be language-tagged wherein in the case of a single user application, it would then be possible to determine at run-time whether the speaker was predominantly using base-language pronunciations or the foreign alternatives. If few foreign alternatives were used, the system may determine that the speaker has little knowledge of the foreign language, so the alternatives could be lowered in probability or discarded completely. Similarly, if the alternatives were used frequently, it would imply good knowledge of the foreign language, so the probability of the base-language versions could be lowered.

In addition, tagging the pronunciations with a language ID would allow the system to respond with the appropriate pronunciation. For example; consider the case of a French speaker wishing to play the song "The summer of 69" on his/her MP3 player. The individual may utter a comment "jouez the summer of sixty-nine", whereby the system should then recognize the correct phrase, tagged with the source language; "JOUEZ THE-SUMMER-OF-69_EN", and play the response "jouant the summer of sixty-nine", rather than "jouant the summer of soixant-neuf".

Another use for a phoneme transformation system would be to refine the pronunciations using the actual utterances spoken by the user. For example, while an exemplary implementation of the invention is to optimize the performance of a recognizer containing multi-language text "out of the box", it is expected that pronunciations produced will be an approximation of what the users actually say. However, when a "working" system exists, once the user confirms that the recognizer has made the correct choice, an utterance can be used to refine the pronunciation, which might be expected to be somewhere between the base language and the transformed foreign pronunciation. This could be achieved, for example by using a similar decision-tree-based pruning technique as was employed in the desktop ViaVoice dictation "addword" module. The variation is this case is that decision trees from both the base and foreign languages would be used as input. These corrected pronunciations could then be stored for subsequent use by the user and collected by the application vendor at appropriate intervals to improve the overall system.

It is to be appreciated that the phoneme transformation process is essentially an automated process that mimics what a speaker attempts to do verbally, i.e., mapping the sound in the foreign language to one in their native tongue. The implementation of the exemplary process of FIG. 1 in a speech recognition and/or speech synthesis system, which utilize a dictionary of phonetic transcriptions to accurately recognize speech and pronunciation of a given word, is useful in augmenting a phonetic dictionary to include native phonetic transcriptions (base forms) for non-native (foreign) words which are automatically derived from non-native phonetic transcriptions of the non-native words, to improve speech synthesis and recognition performance through use of the augmented dictionary.

Figure 2:
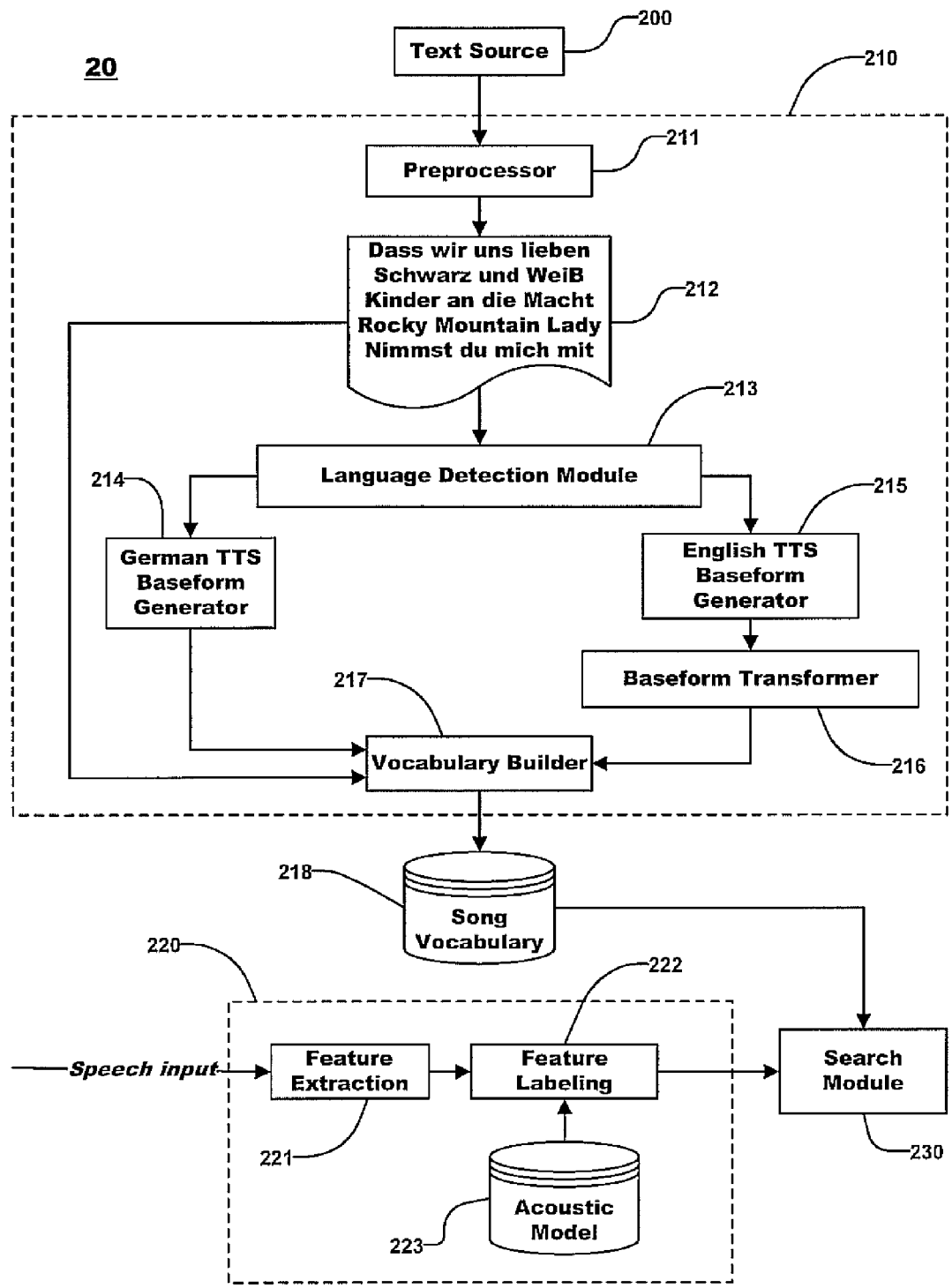
FIG. 2 is a high-level schematic block diagram of a system for automatically generating native pronunciations for non-native words to support a speech based application comprising a front-end ASR (automatic speech recognition) system trained on a native (base) language, according to an exemplary embodiment of the invention.

FIG. 2 is a high-level schematic block diagram of a system (20) for automatically generating pronunciations for non-native words to support a speech based application comprising a front-end ASR (automatic speech recognition) system trained on a native (base) language, according to an exemplary embodiment of the invention. The system (20) of FIG. 2 is an example of the use of the exemplary process of FIG. 1 in a speech based MP3 Player application where a user can search and select a song by uttering a song title from a list contained on a mobile music player. The system (20) includes a text data source (200), a text processing system (210), a song vocabulary (218) (phonetic dictionary of song tiles), a front-end ASR system (220) and search system (230). The text data source (200) may be an IPod, for example, from which text strings of song titles are input to the text processing system (210). The text processing system (210) comprises a text data preprocessor (211), a language detection module (213), a plurality of base form generator modules (214) and (215) for a native language (e.g., German) and one or more non-native languages (e.g., English), a base form transformation module (216), an acoustic vocabulary builder (217), which processes input text of song tiles to generate an acoustic vocabulary of song titles (218) wherein the text song tiles are matched to phonetic spellings of base forms.

The text processor (211) may implement various natural language processing methods known to those of ordinary skill in the art to process text data. For example, the text processor (211) may implement methods for parsing the text data to identify sentences and words in the textual data and transform numbers, abbreviations, etc., into words. Moreover, the text processor (211) may implement methods to perform morphological/contextual/syntax/prosody analysis to extract various textual features regarding part-of-speech, grammar, intonation, text structure, etc. The language diction module (213), native and non-native baseform generations (214), (215) and non-native-to-native baseform transformer module (216) may implement methods as discussed above with regard to respective processing steps 2-4 of the process flow of FIG. 1. The vocabulary builder module (217) implements methods for building a phonetic vocabulary that map the input text corpora (212) with the corresponding phonetic baseforms output from modules 214 and 216. Assuming that the input text includes a plurality of song titles, the output of system (210) is a vocabulary of song titles (218) that supports a search system (230).

The ASR system (220) comprises a feature extraction module (221), a feature labeling module (222) and an acoustic model module (223). The feature extraction module (221) implements known methods to receive and digitizes input speech waveforms (spoken utterances), and transforms the digitized input waveforms into a set of feature vectors on a frame-by-frame basis using feature extraction techniques known by those skilled in the art. The input waveform of feature vectors are input to a feature labeling module (222) which processes feature vector waveform against a trained acoustic model to align and label the feature vector stream into corresponding phonetic units representative of the speech feature vectors, as is well known in the art. The output of the ASR system (220) is a text/phonetic transcription of the input speech. In this exemplary embodiment, a user may utter a request to search for a particular song title (uttered by the user) and the search system (230) will process the text/phonetic transcribed utterance gains the song vocabulary (218) to automatically select a desired song tile, if one exists.

Figure 3:
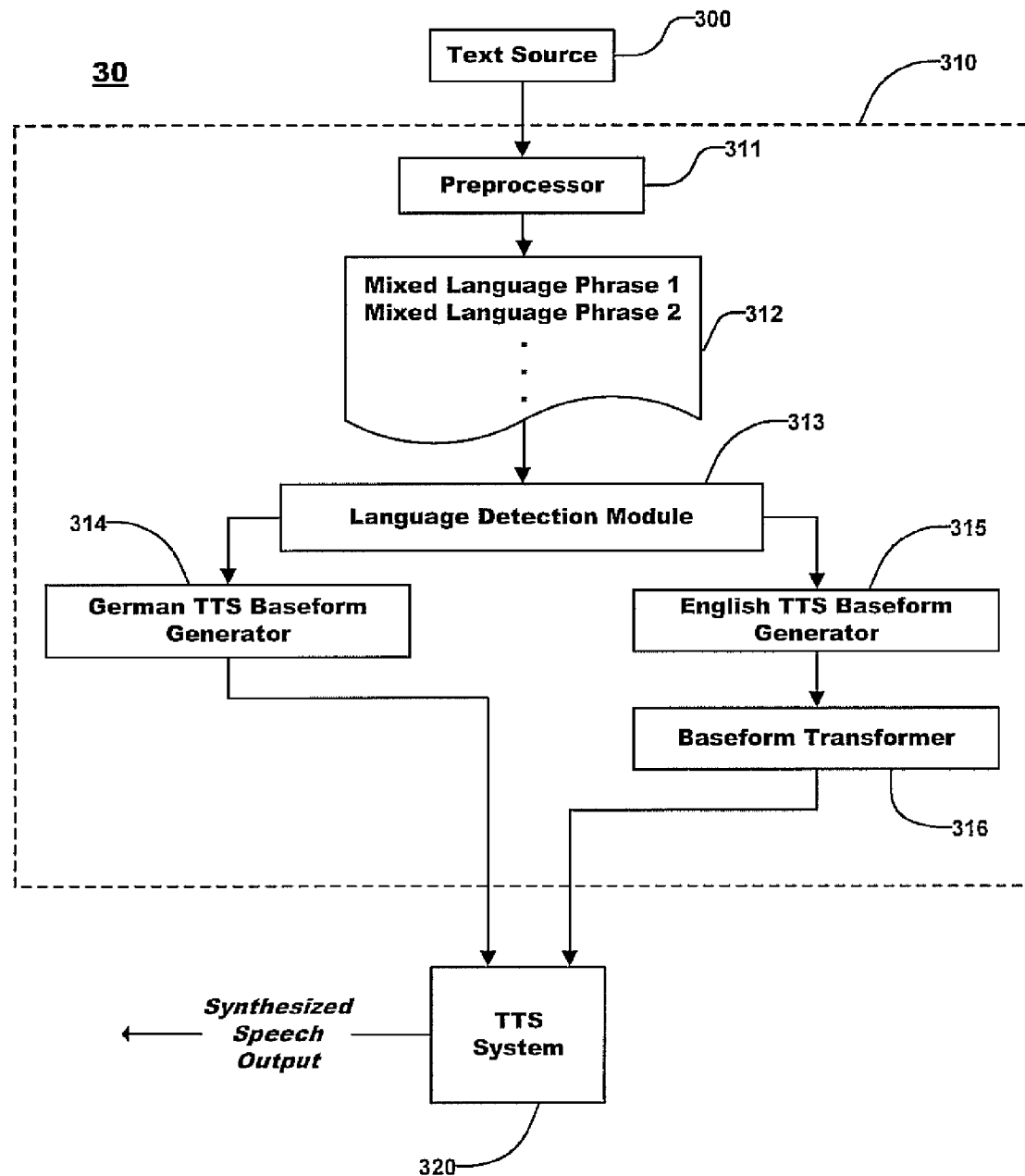
FIG. 3 is a high-level schematic block diagram of a system for automatically generating native pronunciations for non-native words to support a speech based application comprising a TTS (text-to-speech) system trained on a native (base) language, according to an exemplary embodiment of the invention.

FIG. 3 is a high-level schematic block diagram of a system for automatically generating pronunciations for non-native words to support a speech based application comprising a TTS (text-to-speech) system trained on a native (base) language, according to an exemplary embodiment of the invention. The system (30) includes a text data source (300), a text processing system (310), and TTS system (320). The text data source (300) applies text strings to the text processing system (310). Similarly to the processing system (210) of FIG. 2, the text processing system (310) comprises a text data preprocessor (311), a language detection module (313), a plurality of base form generator modules (314) and (315) for a native language (e.g., German) and one or more non-native languages (e.g., English), and a base form transformation module (316).

The output of the text processing system (310) is a phonetic transcription which comprises sequence phonetic descriptors of the phonetic units (e.g., phonemes) representative of the input text data. The phonetic transcription may be segmented such that the phonetic units are grouped into syllables, sequences of syllables, words, sequences of words, etc. The phonetic transcription may be annotated with descriptors corresponding to the various types of textual feature data extracted from the text string (312), as determined by the text preprocessor (311).

The TTS system (320) processes the phonetic strings to generate synthesized speech output representative of the phonetic transcription, using any one of will known methods. One type of TTS referred to as concatenative TTS constructs synthetic speech by concatenating segments of natural speech to form a target utterance for a given text string. The segments of natural speech are selected from a database of recorded speech samples (e.g., digitally sampled speech), and then spliced together to form an acoustic waveform that represents the target utterance. The use of recorded speech samples enables synthesis of an acoustic waveform that preserves the inherent characteristics of real speech (e.g., original prosody (pitch and duration) contour) to provide more natural sounding speech. Typically, with concatenative synthesis, only a finite amount of recorded speech samples are obtained and the database may not include spoken samples of various words of the given language. In such instance, speech segments (e.g., phonemes) from different speech samples may be segmented and concatenated to synthesize arbitrary words for which recorded speech samples do not exist.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for generating base forms for non-native language in a speech-based system trained for processing a native language, the method comprising:
   receiving input textual data containing both native language and non-native language words;
   identifying the native language and non-native language words within the textual data;
   generating a native phonetic transcription of the native language word using phonetic units of the native language;
   generating a non-native phonetic transcription of the non-native language word using phonetic units of the non-native language;
   generating a native pronunciation of the non-native language word using phonetic units of the native language by mapping the phonetic units of the non-native phonetic transcription to acoustically similar phonetic units of the native language; and
   storing the input textual data with the corresponding native phonetic transcription of the native language word and the mapped native pronunciation of the non-native language word in a native phonetic lexicon.

\* \* \* \* \*